US008197582B1

(12) United States Patent
Fugere

(10) Patent No.: US 8,197,582 B1
(45) **Date of Patent: *Jun. 12, 2012**

(54) FLUID DISPENSING SYSTEM HAVING VACUUM UNIT

(75) Inventor: Jeffrey P. Fugere, Sandown, NH (US)

(73) Assignee: DL Technology, LLC., Haverhill, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/023,098

(22) Filed: Feb. 8, 2011

Related U.S. Application Data

(60) Continuation of application No. 12/245,390, filed on Oct. 3, 2008, now Pat. No. 7,905,945, which is a division of application No. 11/037,444, filed on Jan. 18, 2005, now Pat. No. 7,448,857, which is a continuation of application No. 10/295,730, filed on Nov. 15, 2002, now Pat. No. 6,851,923, which is a division of application No. 09/702,522, filed on Oct. 31, 2000, now Pat. No. 6,511,301.

(60) Provisional application No. 60/163,952, filed on Nov. 8, 1999, provisional application No. 60/186,783, filed on Mar. 3, 2000.

(51) Int. Cl.
*B01D 19/00* (2006.01)

(52) U.S. Cl. ............. 96/193; 96/200; 118/610; 222/152

(58) Field of Classification Search .................... 95/266; 96/193, 200; 118/610; 222/152
See application file for complete search history.

(56) References Cited

U.S. PATENT DOCUMENTS

| | | | |
|---|---|---|---|
| 1,746,604 | A | 2/1930 | Piquerez |
| 2,933,259 | A | 4/1960 | Raskin |
| 3,355,766 | A | 12/1967 | Causemann |
| 3,394,659 | A | 7/1968 | Van Alen |
| 3,425,414 | A | 2/1969 | La Roche |
| 3,507,584 | A | 4/1970 | Robbins, Jr. |
| 3,693,884 | A | 9/1972 | Snodgrass et al. |
| 3,734,635 | A | 5/1973 | Blach et al. |
| 3,811,601 | A | 5/1974 | Reighard et al. |
| 3,938,492 | A | 2/1976 | Mercer, Jr. |
| 3,963,151 | A | 6/1976 | North, Jr. |
| 4,004,715 | A | 1/1977 | Williams et al. |

(Continued)

FOREIGN PATENT DOCUMENTS

EP 0110591 10/1986

(Continued)

OTHER PUBLICATIONS

Karassik, Igor J., et al, "Pump Hand Book", Second Ed., McGraw Hill Inc., 1986, pp. 9.30.

(Continued)

*Primary Examiner* — Duane Smith
*Assistant Examiner* — Douglas Theisen
(74) *Attorney, Agent, or Firm* — Onello & Mello, LLP

(57) ABSTRACT

A fluid dispensing system includes a dispensing pump for delivering the fluid material to a substrate. The fluid dispensing system further includes a vacuum unit that draws a vacuum on the feed tube for removing gas impurities from the fluid material.

8 Claims, 8 Drawing Sheets

U.S. PATENT DOCUMENTS

| | | | |
|---|---|---|---|
| 4,077,180 | A | 3/1978 | Agent et al. |
| 4,116,766 | A | 9/1978 | Poindexter et al. |
| 4,168,942 | A | 9/1979 | Firth |
| 4,197,070 | A | 4/1980 | Koschmann |
| 4,239,462 | A | 12/1980 | Dach et al. |
| 4,258,862 | A | 3/1981 | Thorsheim |
| 4,312,630 | A | 1/1982 | Travaglini |
| 4,339,840 | A | 7/1982 | Monson |
| 4,346,849 | A | 8/1982 | Rood |
| 4,377,894 | A | 3/1983 | Yoshida |
| 4,386,483 | A | 6/1983 | Schlaefli |
| 4,408,699 | A | 10/1983 | Stock |
| 4,465,922 | A | 8/1984 | Kolibas |
| 4,513,190 | A | 4/1985 | Ellett et al. |
| 4,572,103 | A | 2/1986 | Engel |
| 4,579,286 | A | 4/1986 | Stoudt |
| 4,584,964 | A | 4/1986 | Engel |
| 4,610,377 | A | 9/1986 | Rasmussen |
| 4,705,218 | A | 11/1987 | Daniels |
| 4,705,611 | A | 11/1987 | Grimes et al. |
| 4,785,996 | A | 11/1988 | Ziecker et al. |
| 4,803,124 | A | 2/1989 | Kunz |
| 4,836,422 | A | 6/1989 | Rosenberg |
| 4,859,073 | A | 8/1989 | Howseman, Jr. et al. |
| 4,917,274 | A | 4/1990 | Asa et al. |
| 4,919,204 | A | 4/1990 | Baker et al. |
| 4,941,428 | A | 7/1990 | Engel |
| 4,969,602 | A | 11/1990 | Scholl |
| 5,002,228 | A | 3/1991 | Su |
| 5,106,291 | A | 4/1992 | Gellert |
| 5,130,710 | A | 7/1992 | Salazar |
| 5,161,427 | A | 11/1992 | Fukuda et al. |
| 5,176,803 | A | 1/1993 | Barbuto et al. |
| 5,177,901 | A | 1/1993 | Smith |
| RE34,197 | E | 3/1993 | Engel |
| 5,265,773 | A | 11/1993 | Harada |
| 5,348,453 | A | 9/1994 | Baran et al. |
| 5,407,101 | A | 4/1995 | Hubbard |
| 5,452,824 | A | 9/1995 | Danek et al. |
| 5,480,487 | A * | 1/1996 | Figini et al. .................. 118/610 |
| 5,535,919 | A | 7/1996 | Ganzer et al. |
| 5,553,742 | A | 9/1996 | Maruyama et al. |
| 5,564,606 | A | 10/1996 | Engel |
| 5,567,300 | A | 10/1996 | Datta et al. |
| 5,699,934 | A | 12/1997 | Kolcun et al. |
| 5,765,730 | A | 6/1998 | Richter |
| 5,785,068 | A | 7/1998 | Sasaki et al. |
| 5,795,390 | A | 8/1998 | Cavallaro |
| 5,803,661 | A | 9/1998 | Lemelson |
| 5,819,983 | A | 10/1998 | White et al. |
| 5,823,747 | A | 10/1998 | Ciavarini et al. |
| 5,833,851 | A | 11/1998 | Adams et al. |
| 5,837,892 | A | 11/1998 | Cavallaro et al. |
| 5,886,494 | A | 3/1999 | Prentice et al. |
| 5,903,125 | A | 5/1999 | Prentice et al. |
| 5,904,377 | A | 5/1999 | Throup |
| 5,918,648 | A | 7/1999 | Carr et al. |
| 5,925,187 | A | 7/1999 | Freeman et al. |
| 5,927,560 | A | 7/1999 | Lewis et al. |
| 5,931,355 | A | 8/1999 | Jefferson |
| 5,947,022 | A | 9/1999 | Freeman et al. |
| 5,947,509 | A | 9/1999 | Ricks et al. |
| 5,957,343 | A | 9/1999 | Cavallaro |
| 5,971,227 | A | 10/1999 | White et al. |
| 5,984,147 | A | 11/1999 | Van Ngo |
| 5,985,029 | A | 11/1999 | Purcell |
| 5,985,216 | A | 11/1999 | Rens et al. |
| 5,992,688 | A | 11/1999 | Lewis et al. |
| 5,992,698 | A | 11/1999 | Copeland et al. |
| 5,993,183 | A | 11/1999 | Laskaris et al. |
| 5,993,518 | A * | 11/1999 | Tateyama ...................... 95/261 |
| 5,995,788 | A | 11/1999 | Baek |
| 6,007,631 | A | 12/1999 | Prentice et al. |
| 6,017,392 | A | 1/2000 | Cavallaro |
| 6,025,689 | A | 2/2000 | Prentice et al. |
| 6,068,202 | A | 5/2000 | Hynes et al. |
| 6,082,289 | A | 7/2000 | Cavallaro |
| 6,085,943 | A | 7/2000 | Cavallaro et al. |
| 6,093,251 | A | 7/2000 | Carr et al. |
| 6,112,588 | A | 9/2000 | Cavallaro et al. |
| 6,119,895 | A | 9/2000 | Fugere et al. |
| 6,126,039 | A | 10/2000 | Cline et al. |
| 6,157,157 | A | 12/2000 | Prentice et al. |
| 6,193,783 | B1 * | 2/2001 | Sakamoto et al. ................ 95/26 |
| 6,196,521 | B1 | 3/2001 | Hynes et al. |
| 6,199,566 | B1 | 3/2001 | Gazewood |
| 6,206,964 | B1 | 3/2001 | Purcell et al. |
| 6,207,220 | B1 | 3/2001 | Doyle et al. |
| 6,214,117 | B1 | 4/2001 | Prentice et al. |
| 6,216,917 | B1 | 4/2001 | Crouch |
| 6,224,671 | B1 | 5/2001 | Cavallaro |
| 6,224,675 | B1 | 5/2001 | Prentice et al. |
| 6,234,358 | B1 | 5/2001 | Romine et al. |
| 6,253,957 | B1 | 7/2001 | Messerly et al. |
| 6,253,972 | B1 | 7/2001 | DeVito et al. |
| 6,257,444 | B1 | 7/2001 | Everett |
| 6,258,165 | B1 | 7/2001 | Cavallaro |
| 6,322,854 | B1 | 11/2001 | Purcell et al. |
| 6,324,973 | B2 | 12/2001 | Rossmeisl et al. |
| 6,354,471 | B2 | 3/2002 | Fujii |
| 6,371,339 | B1 | 4/2002 | White et al. |
| 6,378,737 | B1 | 4/2002 | Cavallaro et al. |
| 6,383,292 | B1 | 5/2002 | Brand et al. |
| 6,386,396 | B1 | 5/2002 | Strecker |
| 6,391,378 | B1 | 5/2002 | Carr et al. |
| 6,395,334 | B1 | 5/2002 | Prentice et al. |
| 6,412,328 | B1 | 7/2002 | Cavallaro et al. |
| 6,428,852 | B1 * | 8/2002 | Pillion et al. .................. 427/346 |
| 6,453,810 | B1 | 9/2002 | Rossmeisl et al. |
| 6,514,569 | B1 | 2/2003 | Crouch |
| 6,540,832 | B2 | 4/2003 | Cavallaro |
| 6,541,063 | B1 | 4/2003 | Prentice et al. |
| 6,562,406 | B1 | 5/2003 | Chikahisa et al. |
| 6,619,198 | B2 | 9/2003 | Rossmeisl et al. |
| 6,626,097 | B2 | 9/2003 | Rossmeisl et al. |
| 6,719,174 | B1 | 4/2004 | Swift |
| 6,736,900 | B2 | 5/2004 | Isogai et al. |
| 6,739,483 | B2 | 5/2004 | White et al. |
| 6,851,923 | B1 | 2/2005 | Fugere |
| 6,892,959 | B1 | 5/2005 | Fugere |
| 6,957,783 | B1 | 10/2005 | Fugere |
| 6,983,867 | B1 | 1/2006 | Fugere |
| 7,178,745 | B1 | 2/2007 | Fugere |
| 7,331,482 | B1 | 2/2008 | Fugere |
| 7,905,945 | B1 * | 3/2011 | Fugere ............................ 95/266 |
| 2002/0007227 | A1 | 1/2002 | Prentice et al. |
| 2002/0020350 | A1 | 2/2002 | Prentice et al. |
| 2003/0000462 | A1 | 1/2003 | Prentice et al. |
| 2003/0066546 | A1 | 4/2003 | Bibeault et al. |
| 2003/0084845 | A1 | 5/2003 | Prentice et al. |
| 2003/0091727 | A1 | 5/2003 | Prentice et al. |
| 2003/0132243 | A1 | 7/2003 | Engel |
| 2004/0089228 | A1 | 5/2004 | Prentice et al. |

FOREIGN PATENT DOCUMENTS

WO WO 00/01495 * 1/2000

OTHER PUBLICATIONS

Micro-Mechanics Design Specifications. May 1999.

"Epoxy Die Attach: The challenge of Big Chips." Rene J. Ulrich. Semiconductor International. Oct. 1994.

"Dispensing Technology: The Key to high-Quality, High-Speed Die-Bonding." Uri Sela and Hans Steinegger. Microelectronics Manufacturing Technology. Feb. 1991.

Affidavit of Jeffrey P. Fugere in connection with Imformation Disclosure Statement filed in Reissue U.S. Appl. No. 10/948,850.

"Dispense Tip with Vented Outlets" Specification, Drawings, and Prosecution History, of U.S. Appl. No. 11/627,231, filed Jan. 25, 2007, by Jeffrey P. Fugere.
"Fluid Pump and Cartridge" Specification, Drawings and Prosecution History of U.S. Appl. No 11/037,444, filed Jan. 18, 2005, by Jeffrey P. Fugere.
"Fluid Pump and Cartridge" Specification, Drawings and Prosecution History of U.S. Appl. No. 10/948,850, filed Sep. 23, 2004, by Jeffrey P. Fugere.
"Fluid Dispense Pump with Drip Prevention Mechanism and Method for Controlling Same" Specification, Drawings and Prosecution History of U.S. Appl. No. 11/328,328, filed Jan. 9, 2006, by Jeffrey P. Fugere.
"Fluid Pump and Cartridge" Specification, Drawings and Prosecution History of U.S Appl. No. 09/702,522, filed Oct. 31, 2000, by Jeffrey P. Fugere.

* cited by examiner

FLUID DISPENSING SYSTEM HAVING VACUUM UNIT

RELATED APPLICATIONS

This application is a continuation application of U.S. application Ser. No. 12/245,390, filed on Oct. 3, 2008, now U.S. Pat. No. 7,905,945, which is a divisional application of U.S. application Ser. No. 11/037,444, filed on Jan. 18, 2005, now U.S. Pat. No. 7,448,857, which is a continuation application of U.S. application Ser. No. 10/295,730, filed Nov. 15, 2002, now U.S. Pat. No. 6,851,923, which is a divisional application of U.S. application Ser. No. 09/702,522, filed Oct. 31, 2000, now U.S. Pat. No. 6,511,301, which claims the benefit of U.S. Provisional application No. 60/186,783, filed Mar. 3, 2000 and U.S. Provisional application No. 60/163,952, filed Nov. 8, 1999, the contents of each application being incorporated herein by reference, in their entirety.

BACKGROUND OF THE INVENTION

Contemporary fluid dispense systems are well suited for dispensing precise amounts of fluid at precise positions on a substrate. A pump transports the fluid to a dispense tip, also referred to as a "pin" or "needle", which is positioned over the substrate by a micropositioner, thereby providing patterns of fluid on the substrate as needed. As an example application, fluid delivery systems can be utilized for depositing precise volumes of adhesives, for example, glue, resin, or paste, during a circuit board assembly process, in the form of dots for high-speed applications, or in the form of lines for providing underfill or encapsulation.

Contemporary dispensing pumps comprise a syringe, a feed tube, a dispense cartridge, and pump drive mechanism. The syringe contains fluid for dispensing, and has an opening at its distal end at which a feed tube is connected. The feed tube is a flexible, hollow tube for delivering the fluid to the cartridge. The cartridge is hollow and cylindrical and includes an inlet neck at which the opposite end of the feed tube is connected. The inlet neck directs the fluid into the hollow, central cartridge chamber.

A feed screw disposed longitudinally through the center of the cylindrical chamber transports the fluid in Archimedes principle fashion from the inlet to a dispensing needle attached to the chamber outlet. A continuously-running motor drives the feed screw via a rotary clutch, which is selectively actuated to engage the feed screw and thereby effect dispensing. A bellows linkage between the motor and cartridge allows for flexibility in system alignment.

Pump systems can be characterized generally as "fixed-z" or "floating-z" (floating-z is also referred to as "compliant-z"). Fixed-z systems are adapted for applications that do not require contact between the dispense tip and the substrate during dispensing. In fixed-z applications, the dispense tip is positioned and suspended above the substrate by a predetermined distance, and the fluid is dropped onto the substrate from above. In floating-z applications, the tip is provided with a standoff, or "foot", designed to contact the substrate as fluid is delivered by the pump through the tip. Such floating-z systems allow for tip travel, relative to the pump body, such that the entire weight of the pump does not bear down on the substrate.

Such conventional pump systems suffer from several limitations. The motor and rotary clutch mechanisms are bulky and heavy, and are therefore limited in application for modern dispensing applications requiring increasingly precise, efficient, and fast operation. The excessive weight limits use for those applications that require contact of the pump with the substrate, and limits system speed and accuracy, attributed to the high g-forces required for quick movement of the system. The mechanical clutch is difficult to control, and coasts to a stop when disengaged, resulting in deposit of excess fluid. Clutch coasting can be mitigated by a longitudinal spring mounted about the body of the feed screw and urged against the chamber end to offer rotational resistance. However, the spring adds to the length of the cartridge, and contributes to system complexity.

The inlet neck feeds directly into the side of the feed screw or "auger". Consequently, as the auger collects material from the small and circular inlet port, high pressure is required for driving the material into the auger body, because the auger threads periodically pass in front of the feed opening, preventing material from entering. This leads to inconsistent material flow. Additionally, the inlet neck is commonly perpendicular to the auger screw, requiring the fluid to make a 90 degree turn upon entering the pump. This further limits material flow and can contribute to material "balling" and clogging.

Overnight storage of dispensed fluids often requires refrigeration of the fluid and cleaning of the system. The syringe is typically mounted directly to a mounting bracket on the pump body such that the output port of the syringe passes through an aperture on the mounting bracket. The feed tube is then coupled to the output port on the opposite face of the bracket. Since the tube and bracket are on opposite sides of the bracket, removal of the syringe from the pump body requires dismantling of the tube and syringe, which can contaminate fluid material positioned at the interface during disassembly. Further, since the syringe and cartridge can not be removed and stored together as a unit, disassembly and cleaning of the cartridge is required. Additionally, the inlet neck is narrow and therefore difficult to clean.

SUMMARY OF THE INVENTION

The present invention is directed to a fluid pump and cartridge system that overcomes the limitations of conventional systems set forth above.

In a first aspect, the present invention is directed to a cartridge adapted for use with a fluid pump. The cartridge includes a material inlet port, a material outlet port, a feed screw, and a reservoir. The feed screw is disposed longitudinally through the body of the cartridge for delivering fluid provided at the inlet port to the outlet port. The inlet port takes the form of an elongated port provided at a side portion of the feed screw proximal to allow for fluid provided at the inlet port. This elongated configuration promotes even distribution of fluid during transport by the feed screw, and lowers system pressure, thereby reducing the likelihood of "balling-up" and/or clogging of fluid.

The inlet port is preferably provided through the cartridge body at an acute angle relative to the reservoir to allow for gravity-assisted fluid delivery. The inner portion of the cartridge may be lined with a carbide or plastic (for example Teflon, torlon, or tercite) liner having an aperture aligned with the inlet port to enhance ease of cleaning. The elongated port of the cartridge may be provided in a wall of the carbide liner.

In another aspect, the present invention is directed to a release bracket for mounting the syringe and cartridge to the body of the pump. In this manner, the syringe, feed tube, and cartridge can be dismantled from the pump body as a unit, allowing for joint storage of the syringe, feed tube and cartridge, while minimizing risk of contamination of the material. Additionally, once the system is initially purged of extraneous gas during initialization, the purged system can be stored as a unit without the need for re-initialization prior to its next use.

In another aspect, the present invention is directed to a fluid pump assembly that employs an electronically-operated servo-motor assembly. A closed-loop servo motor having a rotary encoder is adapted for controlling rotation and position of the feed screw with heightened accuracy, as compared to those of conventional clutch-driven assemblies. For example, in a preferred embodiment, a rotary encoder capable of 8000 counts in a 360 degree range may be employed to achieve dispensing resolution to a degree that is orders of magnitude greater than conventional systems. Servo-motor-based systems further confer the advantages of small, lightweight systems well-suited for high-performance operation. Electronic control allows for complete determination of the acceleration/deceleration of feed screw rotation, allowing for application-specific flow profiles. An orbital gear transmission unit may be provided between the motor and the pump feed screw for providing further accuracy in controlling the feed screw.

In another aspect, the present invention is directed to a pump assembly that is compatible with both floating-z and fixed-z cartridges and dispensing tips. A quick-release pin, which may be spring-biased, is provided on the side of the cartridge body to allow for removal/insertion of cartridges. A fixed-z cartridge includes a hole for receiving the quick-release pin in a fixed relationship. A floating-z cartridge includes a longitudinal groove to permit longitudinal travel of the pin in the groove, and thus allow for floating-z operation.

In another aspect, the present invention is directed to a quick-release mount assembly for mounting a pump to a dispensing frame. The pump body includes a tab feature on its surface for mating with a hole on a mounting plate attached to the dispensing frame. The mounting plate includes a lever for securing the tab when inserted. Guide features may be provided for aligning and guiding the pump body relative to the mounting plate.

In another aspect, the present invention is directed to an apparatus and method for drawing entrapped air from the material supply during a dispensing operation, thereby purging the system of entrapped air. A vacuum is drawn from the material supply, for example by a vacuum tube with needle inserted into a material feed tube, in a direction parallel to material flow through the feed tube. In this manner, air is withdrawn from the dispensed material, leading to an improvement in dispensing consistency, especially at small tolerances.

In another aspect, the present invention is directed to a vacuum purge configuration for removing air entrapped in the body of the cartridge during initialization of a dispensing operation. A first purge interface is placed on the end of the feed tube, and a vacuum is drawn, thereby purging the feed tube of entrapped gas. A second purge interface is then placed on the cartridge body outlet while the feed screw is rotated slowly until material presents itself at the outlet. A vacuum is drawn to eliminate entrapped gas from the cartridge. A third purge interface is then placed on the needle assembly and a vacuum is drawn to eliminate entrapped air from the needle body. Entrapped air is thus substantially removed from the feed tube, auger screw and dispensing needle. Normal dispensing can commence following removal of the purge interface.

In another aspect, the present invention is directed to a bellows means inserted at the piston end of and replacing the piston of a dispensing syringe. The bellows is pressurized from within and expands, thereby exerting pressure on the underlying material, forcing material flow. In this manner, material can be driven with minimal pressure, and with minimal air migration into the material, as compared to plunger-style drivers. In a preferred embodiment, the bellows comprises a latex film applied about the lip of the syringe top. The syringe top is preferably vented to allow for expansion of the bellows.

In another aspect, the present invention is directed to a pump cartridge having a material feed aperture that is elongated with respect to the primary axis of the feed screw. In this manner, a larger portion of the feed screw threads are exposed to the material supply, leading to improvement in dispensing consistency. In a preferred embodiment, a carbide cartridge liner is inserted in the cartridge cavity between the cartridge body and the feed screw, and the elongated aperture is provided in the body of the carbide insert to provide increased material supply exposure.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1A:
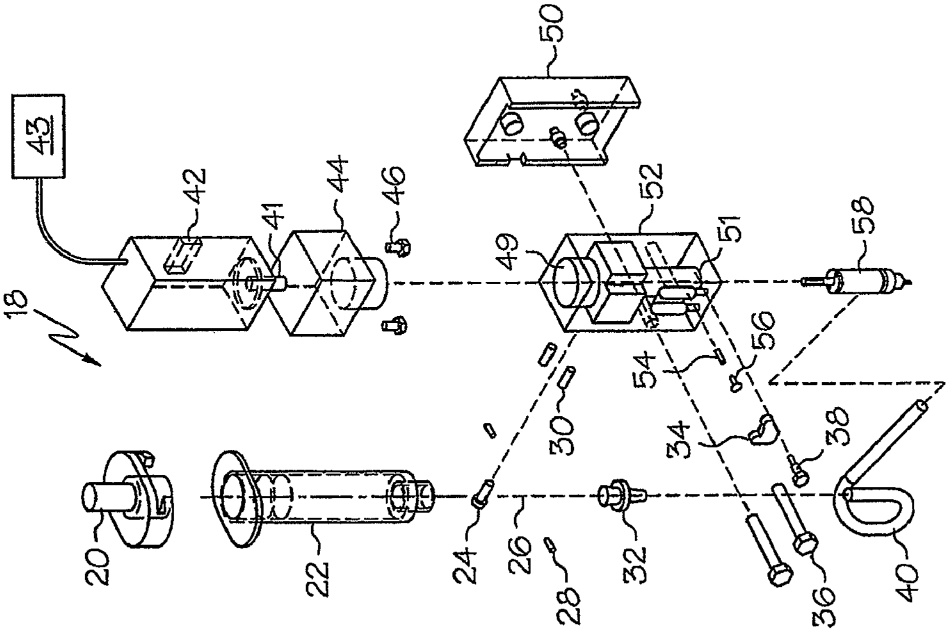
FIGS. 1A and 1B are an exploded perspective view and an assembled perspective view respectively of a pump assembly configured in accordance with the present invention.
Figure 1B:
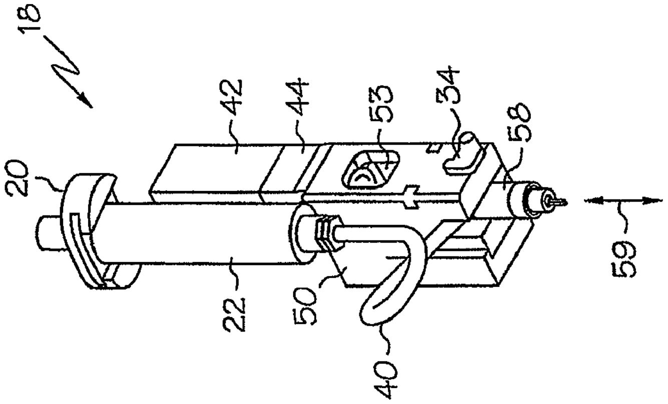

FIGS. 1A and 1B are an exploded perspective view and an assembled perspective view respectively of a pump assembly configured in accordance with the present invention. With reference to FIGS. 1A and 1B, an embodiment of the dispensing pump 18 comprises a motor 42, an optional transmission box 44, a pump housing 52, and a cartridge 58.

The motor 42 preferably comprises a closed-loop servo motor with an independent motion controller 43. The motion controller 43 may be provided by the host dispensing platform, and may comprise, for example, a Delta Tau controller, Northbridge, Calif., USA. The closed-loop servo motor may comprise, for example, a Sigma Mini Series motor, produced by Yaskawa Electric Corp., Japan. Feedback is preferably provided by a rotary encoder, for example providing 8192 discrete counts over 360 degree rotation. The motor 42 includes an axle 41 which operates to drive the feed screw in the cartridge assembly 58 (described below). In this manner, high-performance control is maintained over material dispensing. For example, rotary position, rotational velocity, and acceleration/deceleration of the feed screw can be readily controlled by the closed-loop servo motor, and is easily programmed at the controller 43. This is compared to conventional embodiments that rely on timed open-loop coasting of a mechanical clutch for control over the feed screw. Additionally, the closed-loop servo-motor is generally a compact system that is small, lightweight, and designed for high-performance operation; as compared to the bulky, inefficient, and inaccurate conventional motor pump systems.

An optional planetary-gear transmission box 44 may be provided to step down the available motor positions, thereby providing even more enhanced control over angular position of the feed screw. For example, step-down transmissions offering 7:1, 25:1, and 48:1 step-down ratios are available for increasing the number of angular steps from 8,192 to 57,344, 204,800 and 393,216 respectively, depending on the application. Such transmission boxes are also available in compact units that match well in size and weight with the closed-loop servo motor 42.

The pump housing 52 comprises a machined or die cast body having an opening 49 at a top portion for receiving the motor drive axle 41 or optional transmission box 44 drive axle (not shown). The interior of the housing 52 is hollow for receiving a cartridge 58 that extends through the housing 52 from an opening 51 at a bottom portion, upward to the top portion, and interfaces with the motor drive axle or transmission box drive axle. The motor 42 and transmission box 44 are mounted to each other, and to the housing 52, by bolts 46, and screws 24, 28, and 30. Cavities 53 are preferably provided in the walls of the housing 52, in order to reduce weight.

Figure 6B:
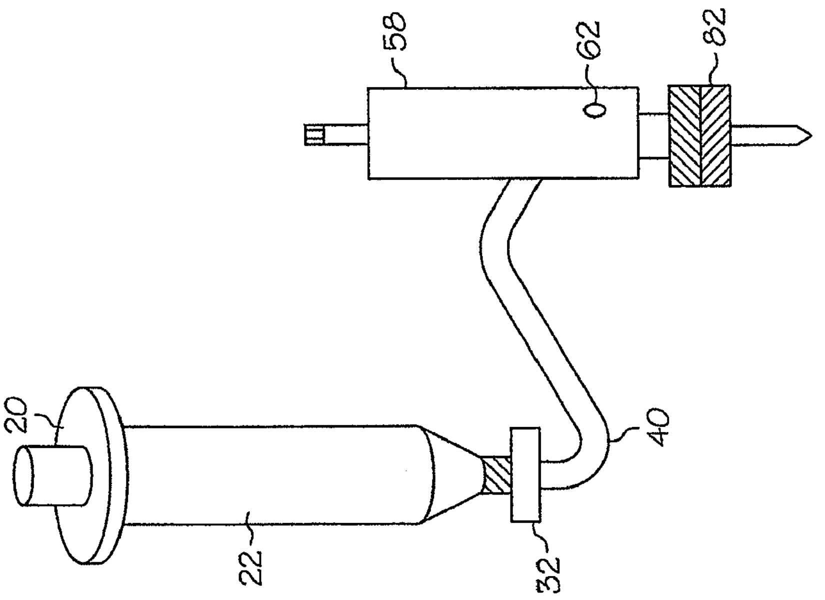
FIGS. 6A and 6B illustrate operation of the syringe and cartridge quick release mechanisms, in accordance with the present invention.
Figure 6A:
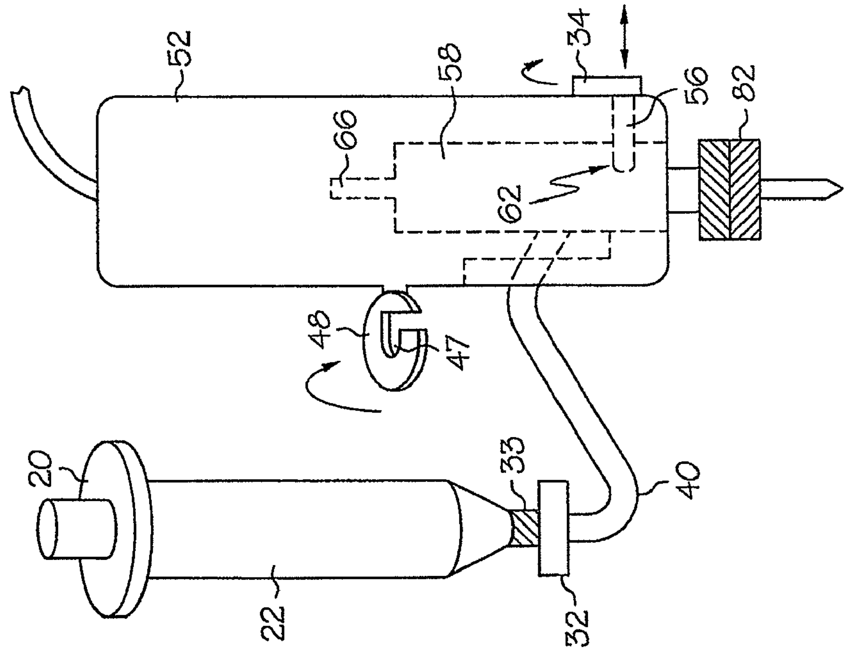

A cartridge release lever 34 is rotatably mounted to the housing 52 by bolt 38. When rotated, the cartridge release lever 34 engages an actuator pin 56, biased by spring 54 to remain in a released position. With reference to FIGS. 6A and 6B, the actuator pin 56 extends into the body of the housing 52 and engages an actuator pin capture 62 (see FIG. 2B) or elongated actuator pin capture 86 (see FIG. 3B) formed in the cartridge body 60. In this manner the cartridge release lever is operable to remove/insert a cartridge 58 at the underside of the housing 52 as indicated by arrow 59 (see FIG. 1B).

A syringe 22 and feed tube 40 are releasibly coupled to a side wall of the housing, as shown. The syringe 22 includes a syringe holder 20, a syringe body 22, and a syringe outlet 32, shown exploded along an axis 26. The feed tube 40 is preferably formed of a flexible material, a first end of which elastically deforms to fit over the end of the syringe outlet 32 to form a tight seal. The second end of the feed tube 40 inserts into a feed aperture 64, also referred to herein as an inlet port 64 (see FIGS. 2B and 3B) formed in the cartridge body 60.

With reference again to FIGS. 6A and 6B, the syringe 22 is likewise preferably configured to be readily separable from the pump housing 52, along with the cartridge 58. To accommodate this feature, a syringe quick-release arm 48 extends from a side wall of the pump housing 52, and includes a slot 47 for snap-capturing a neck portion 33 of the syringe outlet. The quick release arm preferably elastically deforms to receive the neck 33, and to fix the syringe 22 in position during a dispensing operation. In this manner, the cartridge release lever 34 operates in conjunction with the syringe quick release arm to allow for easy removal and storage of the cartridge mechanism 58 and syringe 22 as a unit. This is especially helpful in situations where overnight refrigeration of the dispensing material is required, since the entire material pathway can be removed and stored as a unit, without the need for disassembly and cleaning of the individual components, as required by conventional pump configurations.

Figure 7A:
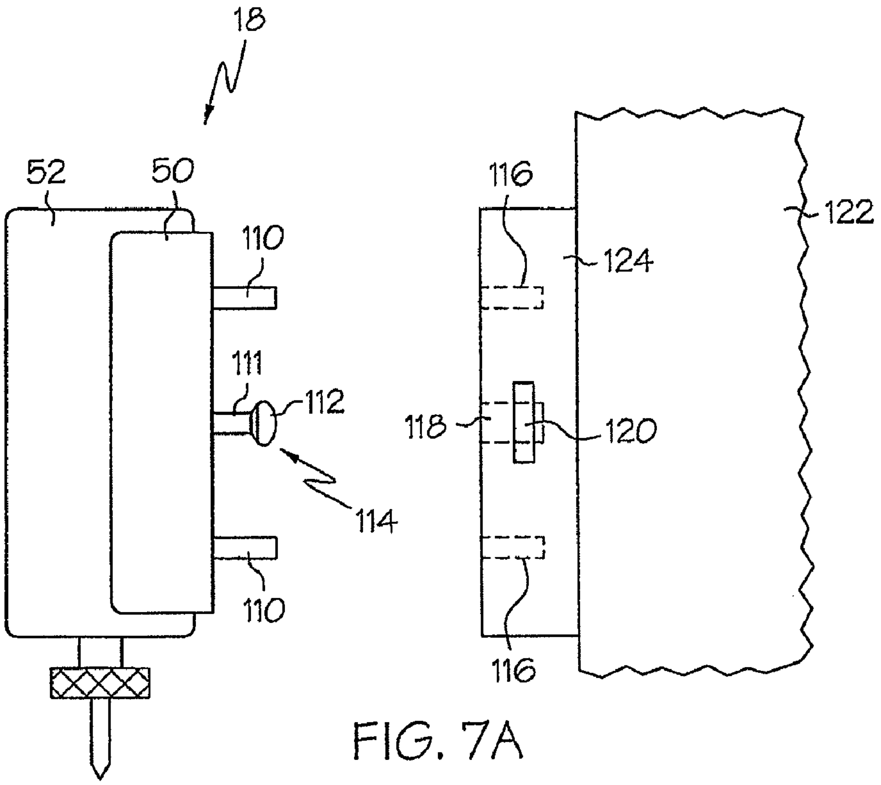
FIGS. 7A and 7B illustrate a side view and front view respectively of a quick-release mounting plate, for mounting the pump to a pump dispensing frame, in accordance with the present invention.
Figure 7B:
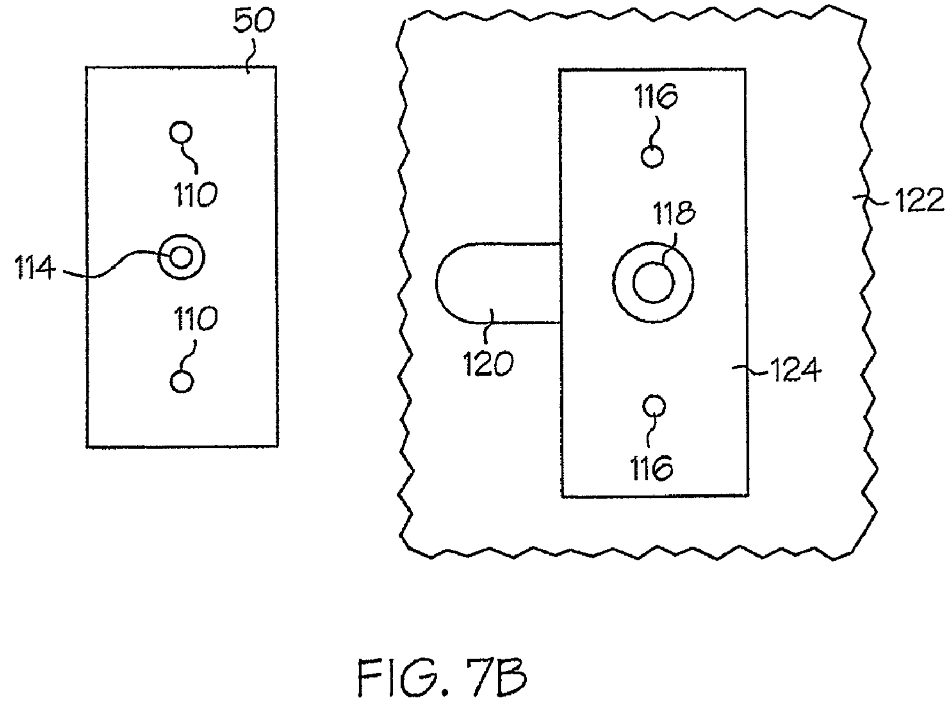

A release bracket 50 is mounted to a side wall of the housing 52 by bolts 36. With reference to FIGS. 7A and 7B, the release bracket 50 includes first and second alignment pins 110 and a central lock pin 114, including a body 111 and retaining head 112, extending outwardly from its surface. A corresponding release bracket plate 124 is mounted to a dispensing frame 122, and includes alignment pin captures 116, a lock pin capture 118 and a spring-loaded lever 120. When operated, the lever, engages/disengages a clasp within the lock pin capture 118, that, in turn, clasps the retaining head 112 of the release bracket, when inserted and properly aligned with the plate 124. In this manner, the pump 18 can be readily attached/detached from the pump dispensing frame for maintenance and inspection.

Figure 2A:
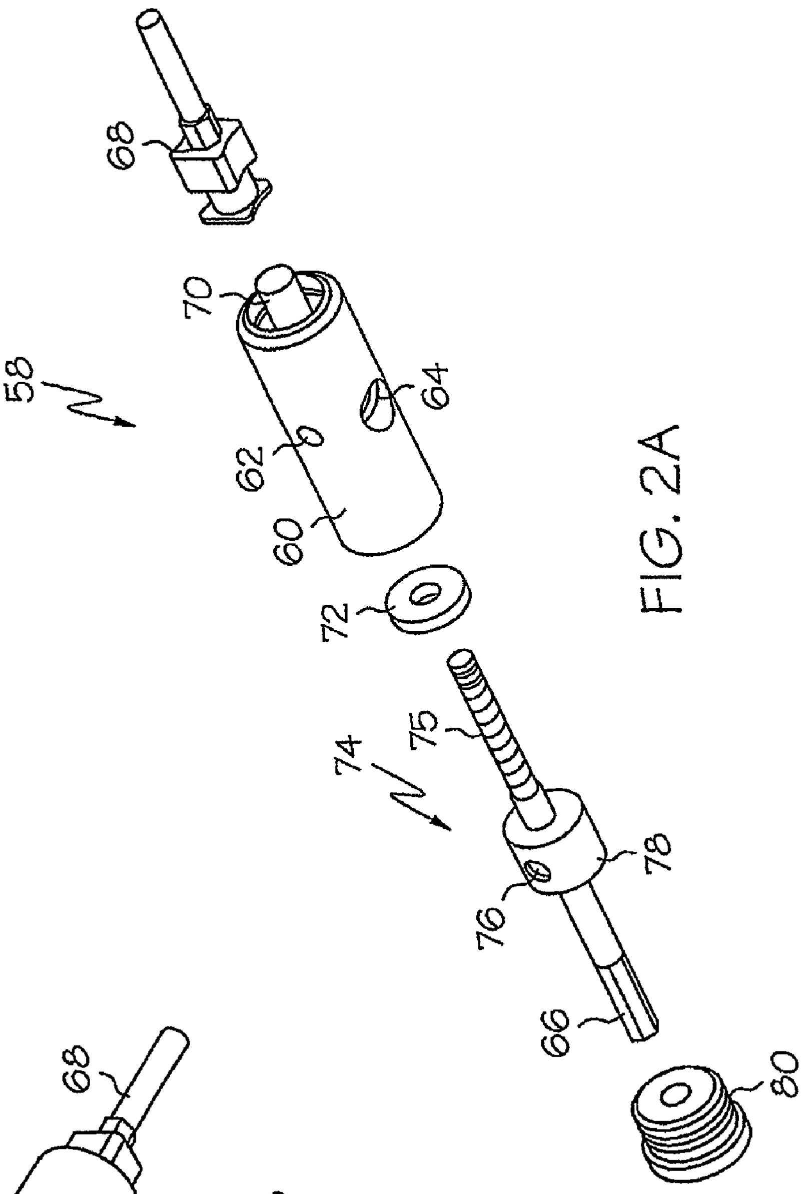
FIGS. 2A and 2B are an exploded perspective view and an assembled perspective view respectively of a fixed-z-type cartridge assembly in accordance with the present invention.
Figure 2B:
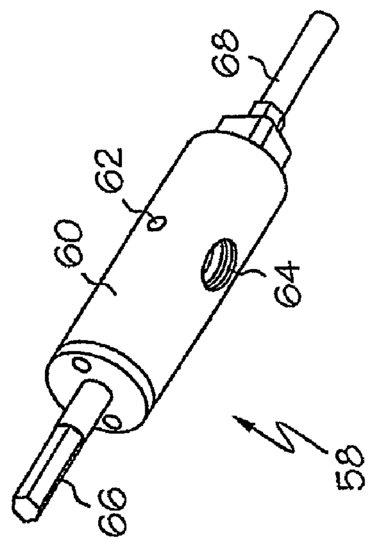

FIGS. 2A and 2B are an exploded perspective view and an assembled perspective view respectively of a fixed-z-type cartridge 58 assembly in accordance with the present invention. The cartridge assembly includes an elongated cartridge body 60, a first end of which is adapted to receive a fixed-z-type dispensing needle, for example Luer™-style needle 68. An opening at a second end of the cartridge receives an auger screw, or feed screw 74 having threads 75 at a first end, and having an indexed shaft 66 at an opposite end, adapted to register with the motor axle 41, or transmission axle. The auger screw 74 includes a collar 78, the height of which is adjustable by set screw 76. Washer 72 ensures a tight seal. A cap nut 80 contains the various cartridge components within the cartridge body 60. As explained above, a feed aperture or inlet port 64 is formed in the body 60 of the cartridge for receiving an end of the feed tube, for the delivery of material toward the feed screw threads 75. An actuator pin capture 62 engages the cartridge release pin 56, as described above. In the fixed-z embodiment of FIGS. 2A and 2B, the actuator pin capture 62 is the size of the release pin, to prevent longitudinal travel of the pump.

Figure 3A:
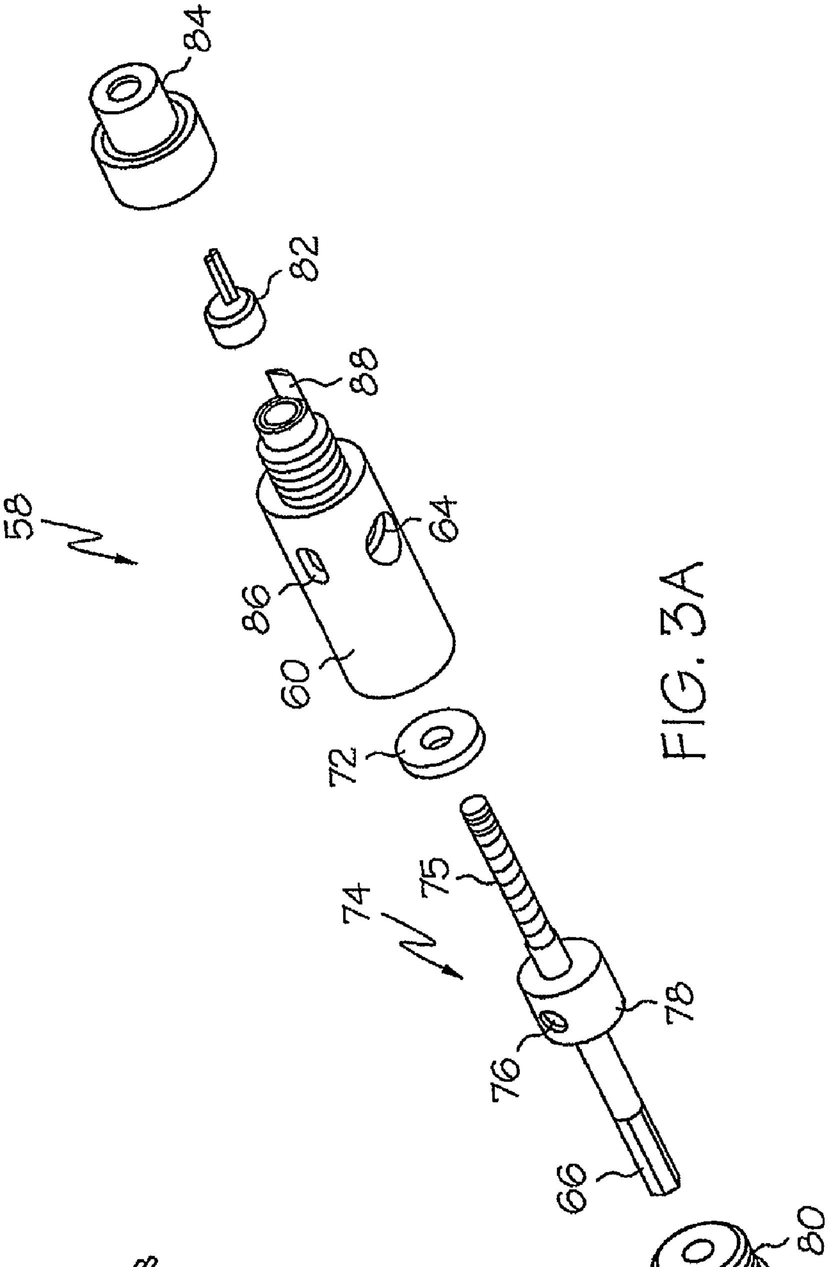
FIGS. 3A and 3B are an exploded perspective view and an assembled perspective view respectively of a floating-z-type cartridge assembly in accordance with the present invention
Figure 3B:
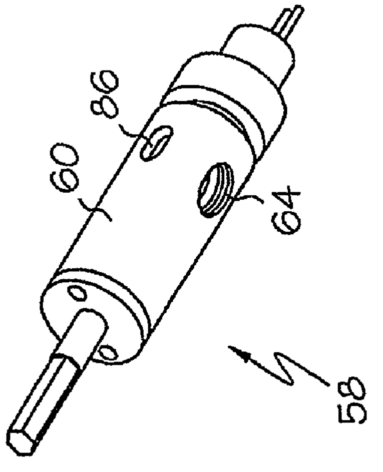

FIGS. 3A and 3B are an exploded perspective view and an assembled perspective view respectively of a floating-z-type cartridge 58 assembly in accordance with the present invention. In this embodiment, the feed screw mechanism is similar to that of FIGS. 2A and 2B; however, the cartridge is adapted for receiving a floating-z-type dispensing needle body 82. The needle body 82 registers with locator 88 at the cartridge outlet, and is fixed in place by needle nut 84. For the floating-z-type cartridge assembly, an elongated actuator pin capture 86 is provided to allow for longitudinal travel of the cartridge 58 relative to the pump housing 52 during a dispensing operation.

Figure 4A:
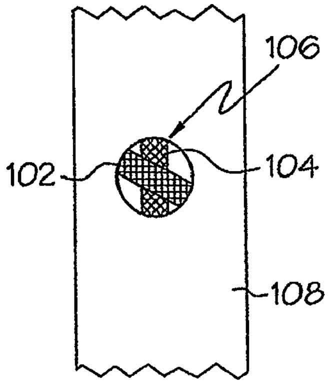
FIG. 4A (PRIOR ART)
FIGS. 4A, 4B and 4C are side views of a cartridge opening illustrating the conventional embodiment having a small, circular opening, and first and second embodiments of the present invention having elongated openings respectively.

FIG. 4A of a inlet port for a conventional cartridge 108 embodiment having a small, circular port opening 106. In this embodiment, it can be seen that the pressurized material entering the port opening 106 periodically confronts a major diameter of the feed screw thread 102, which periodically inhibits flow of material into the feed screw cavity formed between the minor diameter portion 104 of the thread and the interior wall of the cartridge body 108. As much as ⅓ to ½ of the port opening can be periodically blocked by the major diameter of the feed screw thread 102 at any given time. The blockage fluctuates as a function of the rotational position of the feed screw which can cause inconsistency in material dispensing, especially at small tolerances. The blockage further increases the likelihood of material stagnation and drying at the inlet port, in turn causing system contamination.

Figure 4B:
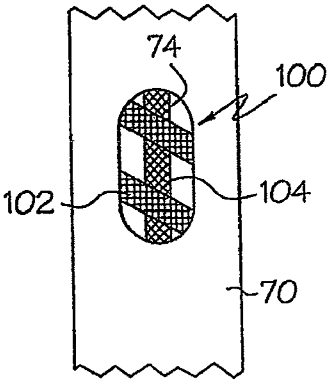
Figure 4C:
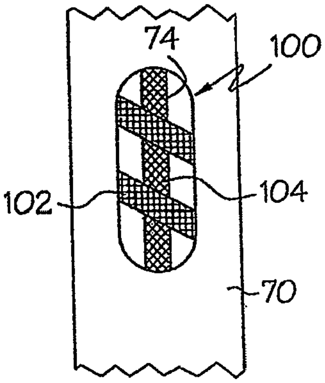

The present invention overcomes this limitation by providing an elongated cartridge inlet port 100. With reference to FIGS. 4B and 4C, the elongated inlet port 100 of the present invention is preferably elongated in a longitudinal direction, with respect to the longitudinal axis of the feed screw 74. In this manner, dispensing material is presented to a larger portion of the feed screw cavity formed between the minor diameter portion 104 and the inner wall of the cartridge 70. This configuration reduces pressure requirements for material delivery through the system, and enhances consistency in material flow, as the dependency on material flow rate as a function of the feed screw thread position is mitigated or eliminated. In general, a longer inlet port as shown in FIG. 4B or 4C is preferred, as compared to the relatively shorter inlet port 106 shown in FIG. 4A; however, the inlet port 100 should not be so long as to provide an opportunity for pooling of dormant material in the inlet port 100 prior to flow through the feed screw 74.

Figure 5A:
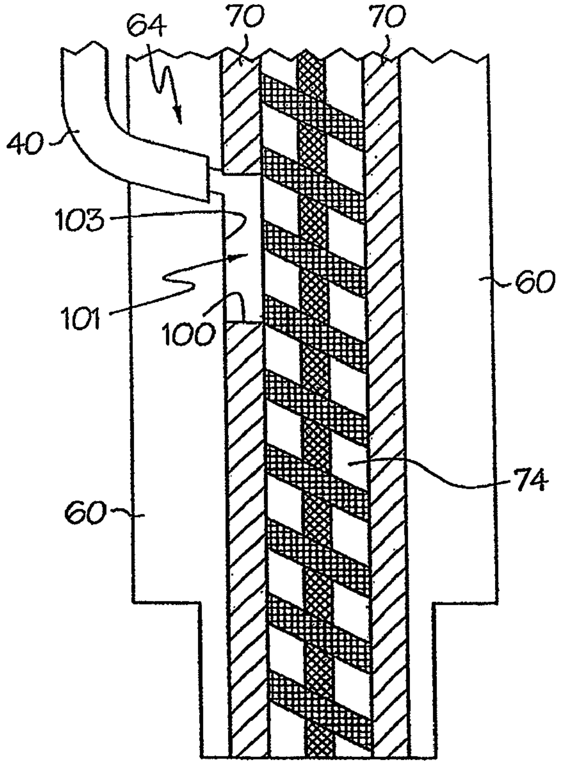
FIG. 5A is a cutaway side view of a cartridge feed mechanism employing a carbide liner including an elongated slot at the inlet to allow for increased capturing of input material at the feed screw inlet, in order to promote consistency in material flow at a reduced pressure, in accordance with the present invention.
Figure 5B:
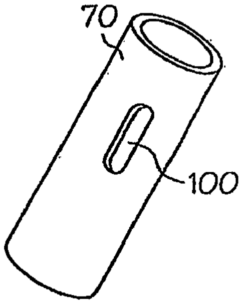
FIG. 5B is a perspective view of the liner having an elongated slot, in accordance with the present invention.

FIG. 5A is a cutaway side view of a cartridge feed mechanism employing a carbide liner 70 including an elongated inlet port 100 to allow for increased capturing of input material at the feed screw inlet, in order to promote consistency in material flow at a reduced pressure, in accordance with the present invention. FIG. 5B is a perspective view of the liner 70 having an elongated inlet port 100, in accordance with the present invention.

In this embodiment, the elongated inlet port 100 is provided by a slot formed in a side wall of a cylindrical carbide liner 70 inserted in the cartridge body 60 about the feed screw 74. The cartridge inlet port 64 comprises a standard circular bore formed in the cartridge body 60, preferably at an acute angle relative to the feed screw 74, to allow gravity to assist in material flow. An elongated chamber, or pocket 101, is formed within the inlet port 100, between the feed screw 74 and the inner wall 103 of the cartridge body, in a region proximal to the inlet port 64. The elongated pocket 101 allows for dispensing fluid to migrate in a downward direction, and is captured by the feed screw threads over a larger surface area, conferring the various advantages outlined above.

Figure 8:
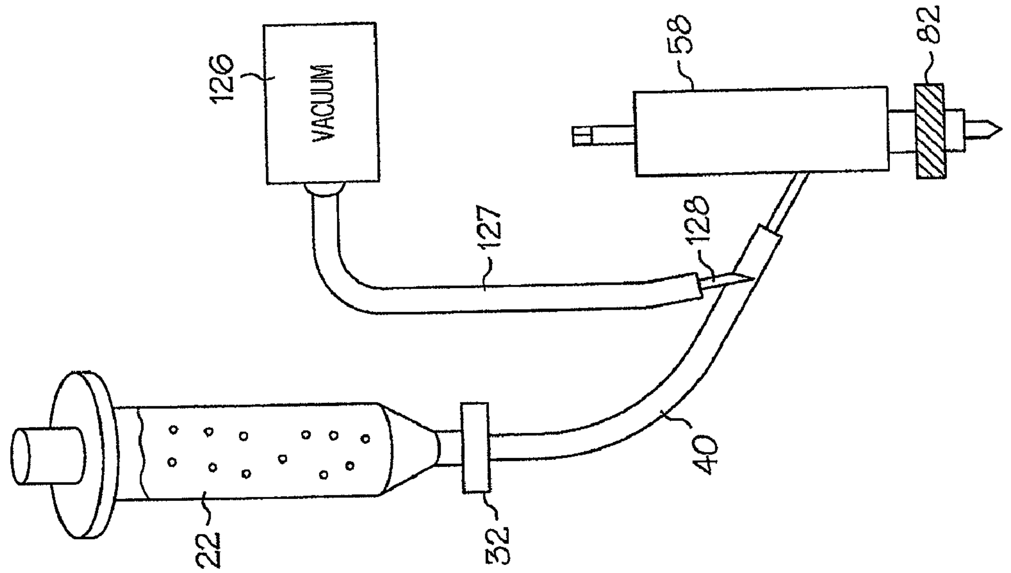
FIG. 8 is a illustration of an improved dispensing configuration employing a vacuum tube inserted into the material feed tube, in accordance with the present invention.

FIG. 8 is a illustration of an improved dispensing configuration employing a vacuum tube inserted into the material feed tube. In this embodiment, entrapped gas impurities, such as air microbubbles, are drawn from the material supply during a dispensing operation, thereby purging the system of entrapped air. A vacuum unit 126 draws a vacuum from the material supply tube 40, for example by a vacuum tube 127 with needle 128 inserted into the material feed tube 40, along the direction of material flow, as shown. In this manner, air is withdrawn from the dispensed material, leading to an improvement in dispensing consistency, especially at small tolerances.

Figure 9:
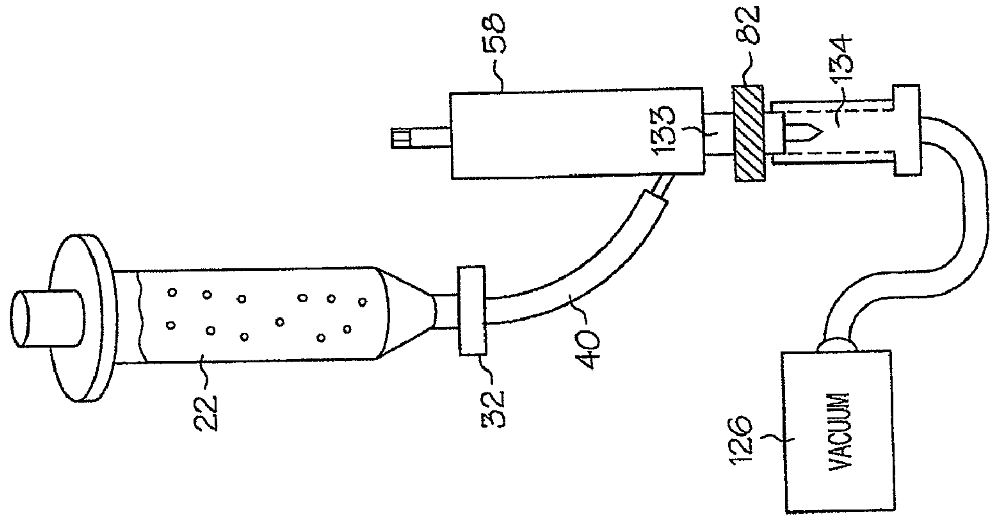
FIG. 9 is an illustration of an air purge configuration wherein a purge vacuum is applied to the needle assembly for initially purging the material flow of air pockets, to prime the system for dispensing, in accordance with the present invention.

FIG. 9 is an illustration of an air purge configuration wherein a purge vacuum is applied to the needle assembly for initially purging the material flow of air pockets, to prime the system for dispensing. In this process, a purge interface 134 is referred to as a first purge interface 134, wherein the second purge interface 134 is placed on the end of the feed tube 40, and a vacuum is drawn by vacuum unit 126, thereby purging the feed tube 40 of entrapped gas. Next, as shown in FIG. 9, the purge interface 134 is referred to as a second purge interface 134, wherein second purge interface 134 is placed on the cartridge body outlet 133 while the feed screw is rotated slowly until material presents itself at the outlet 133. A vacuum is drawn by vacuum unit 126 to eliminate entrapped gas from the cartridge. The purge interface 134 is also referred to as a third purge interface 134, wherein the third purge interface 134 is then placed on the needle body 82 and a vacuum is drawn by vacuum unit 126 to eliminate entrapped air from the needle body. Entrapped air is thus substantially removed from the feed tube, auger screw and dispensing needle. Normal dispensing can commence following removal of the purge interface. Note that the first, second and third purge interfaces 134 may require different interface configurations for the different components undergoing purging.

Figure 10:
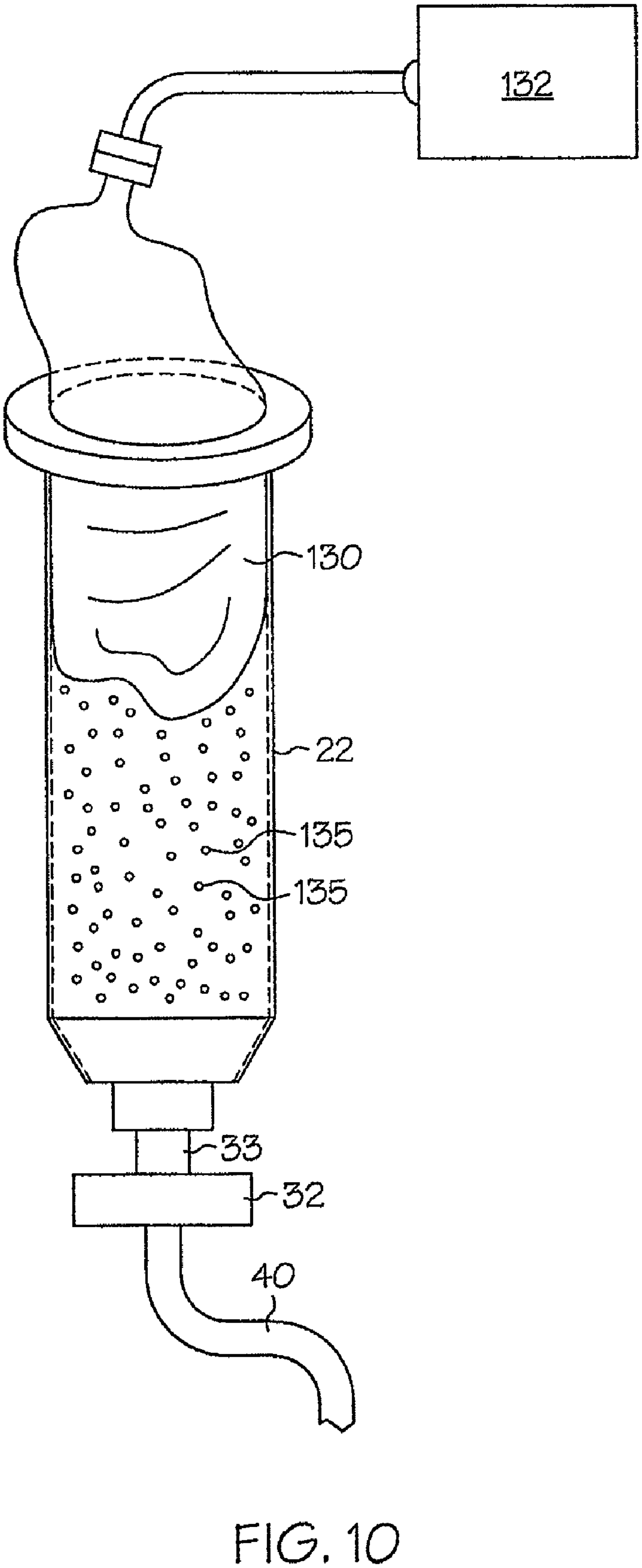
FIG. 10 is an illustration of a bellows configuration for application to the top of a material feed syringe, allowing for use of minimal pressure to drive material flow with mitigation or elimination of air migration into the material, in accordance with the present invention.

FIG. 10 is an illustration of a bellows configuration for application to the top of a material feed syringe, allowing for use of minimal pressure to drive material flow with mitigation or elimination of air migration into the material. In this configuration, a bellows means 130, for example comprising an air-tight, flexible material, is inserted at the piston end of and replaces the piston of a dispensing syringe 22. The bellows is pressurized by air pressure unit 132 from within and expands, thereby exerting pressure on the underlying material 135, forcing material flow through the outlet 32. In this manner, material can be driven with minimal pressure, and with minimal air migration into the material, as compared to plunger-style drivers. In a preferred embodiment, the bellows comprises a latex film applied about the lip of the syringe top. The flexible latex film serves to conform to the inner walls of the syringe during expansion, pushing the underlying material in a downward direction The syringe top is preferably vented to allow for expansion of the bellows.

In this manner a high-performance, lightweight pump configuration is provided. The pump is operable in both fixed-z and floating-z mode. Quick release mechanisms provide for storage of the syringe and cartridge as a single unit, without the need for component disassembly. The components themselves are relatively easy to clean and maintain. The elongated inlet port provides for enhanced dispensing consistency at a lower material pressure, while the various purging and priming techniques allow for removal of entrapped gases, further improving dispensing consistency.

While this invention has been particularly shown and described with reference to preferred embodiments thereof, it will be understood by those skilled in the art that various changes in form and detail may be made herein without departing from the spirit and scope of the invention as defined by the appended claims.

For example, the enhanced control over material flow offered by the various configurations of the present invention make the pump system of the present invention especially amenable to use with dispense needles having a flat dispensing surface with a cross pattern formed in the dispensing surface for dispensing a cross pattern for providing a fillet for bonding a die to a substrate. Particularly, since the closed-loop servo motor pump of the present invention offers control over both position and velocity of the feed screw, the delivery of fluid through the needle to the cross pattern can be controlled to a level of precision previously unattainable. Cross-pattern-style fillets can be achieved at a level of accuracy orders of magnitude beyond those currently achieved.

I claim:

1. A fluid dispensing system comprising:

a container with fluid material;

a fluid dispensing pump for delivering the fluid material to a substrate;

a feed tube for transporting the fluid material from the container to the fluid dispensing pump;

a vacuum unit for drawing a vacuum on the feed tube for removing gas impurities from the fluid material.

2. The fluid dispensing system of claim 1, further comprising a dispense tip coupled to the fluid dispensing pump.

3. The fluid dispensing system of claim 2, wherein the vacuum unit comprises a purge interface that is positioned at the dispense tip to draw the vacuum at the dispense tip.

4. The fluid dispensing system of claim 2, wherein the dispensing pump comprises a cartridge unit, the cartridge unit comprising a cartridge body, a feed screw, and an cartridge body outlet that outputs the fluid material to the dispense tip.

5. The fluid dispensing system of claim 4, wherein the vacuum unit comprises a purge interface that removes gas from the cartridge unit.

6. The fluid dispensing system of claim 5, wherein the purge interface is positioned at the dispense tip while material is present in the cartridge body.

7. The fluid dispensing system of claim 1, further comprising a hollow needle coupled to the vacuum unit, wherein the needle is inserted in the feed tube.

8. The fluid dispensing system of claim 7, wherein the needle is inserted in the feed tube in a direction of material flow.

* * * * *